(12) United States Patent
Yen

(10) Patent No.: US 9,118,202 B2
(45) Date of Patent: Aug. 25, 2015

(54) BATTERY STATUS DETECTION METHOD AND APPARATUS FOR ELECTRONIC DEVICE

(75) Inventor: Ming-Chou Yen, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 429 days.

(21) Appl. No.: 13/588,319

(22) Filed: Aug. 17, 2012

(65) Prior Publication Data
US 2013/0043832 A1 Feb. 21, 2013

(30) Foreign Application Priority Data

Aug. 17, 2011 (TW) .............................. 100129437 A

(51) Int. Cl.
*H02J 7/04* (2006.01)
*H02J 7/16* (2006.01)
*H02J 7/00* (2006.01)

(52) U.S. Cl.
CPC ............ *H02J 7/0086* (2013.01); *H02J 7/0036* (2013.01)

(58) Field of Classification Search
USPC ........................................................ 320/165
See application file for complete search history.

(56) References Cited

U.S. PATENT DOCUMENTS

| | | | |
|---|---|---|---|
| 6,340,876 B1 | 1/2002 | Saint-Pierre | |
| 6,420,854 B1 | 7/2002 | Hughes et al. | |
| 6,487,670 B1 * | 11/2002 | Racino et al. | 713/340 |
| 2009/0273317 A1 * | 11/2009 | Fan et al. | 320/145 |

FOREIGN PATENT DOCUMENTS

| | | |
|---|---|---|
| CN | 1992466 A | 7/2007 |
| CN | 101488594 A | 7/2009 |

OTHER PUBLICATIONS

Taiwan Intellectual Property Office, "Office Action", Nov. 15, 2013.

* cited by examiner

*Primary Examiner* — Eric Lee
(74) *Attorney, Agent, or Firm* — WPAT, PC; Justin King

(57) ABSTRACT

A battery status indicating method for an electronic device is provided. The battery module is pluggable into the electronic device. When a residual electric quantity of the battery module is lower than a threshold electric quantity, the battery module stops outputting a battery voltage. The battery status indicating method includes steps of judging whether the battery module is in a plugged status or an unplugged status according to the battery voltage, periodically charging the battery module in a first time interval of a fixed cycle if the battery module is in the unplugged status, and judging whether the battery module is switched to the unplugged status according to a change of the battery voltage if the battery module is in the plugged status.

10 Claims, 7 Drawing Sheets

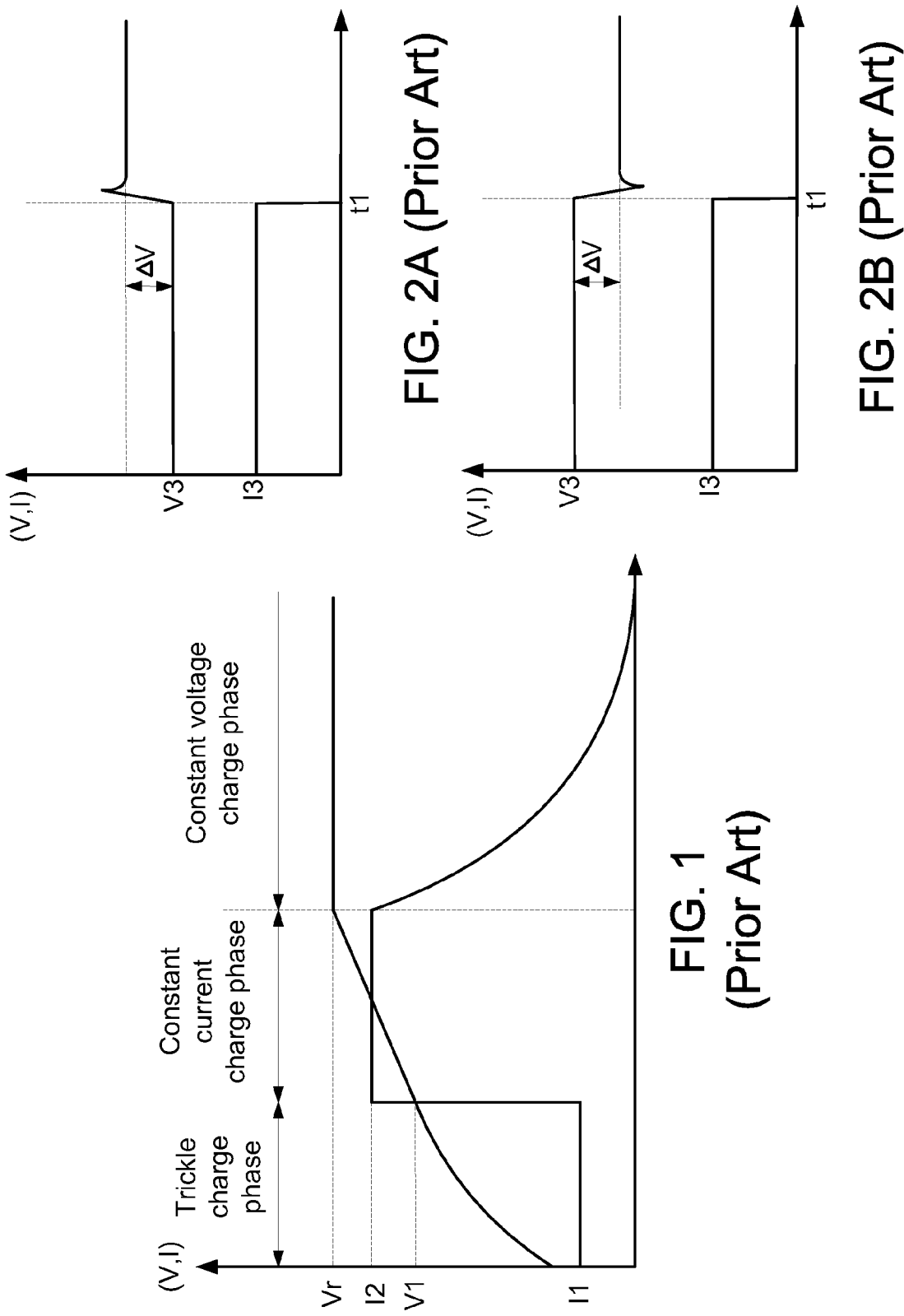

BATTERY STATUS DETECTION METHOD AND APPARATUS FOR ELECTRONIC DEVICE

This application claims the benefit of Taiwan Patent Application No. 100129437, filed Aug. 17, 2011, the subject matter of which is incorporated herein by reference.

FIELD OF THE INVENTION

The present invention relates to a battery status detection method and a battery status detection apparatus, and more particularly to a battery status detection method and a battery status detection apparatus for detecting whether a battery module is plugged into or unplugged from an electronic device.

BACKGROUND OF THE INVENTION

In an electronic device, a detection circuit is essential to detect whether the battery is connected to the charger within the electronic device or not. After the detection circuit confirms that the battery is connected with the charger and an external power source is connected to the electronic device, the charger can perform a charging operation base on battery charge capacity. The electronic device is for example a notebook computer, a personal digital assistant (PDA), a mobile phone, or the like.

FIG. 1 is a schematic timing diagram illustrating a charging current and a terminal voltage of a battery for an electronic device according to the prior art. Generally, the electronic device has a charger. According to the residual charge capacity, the charger may perform a charging operation. During the charging operation is performed, the charging process may be divided into three phases, including a trickle charge phase, a constant current charge phase and a constant voltage charge phase.

Please refer to FIG. 1 again. In a case that the residual charge capacity is very low, the charger is operated in the trickle charge phase to charge the battery at a low constant current I1. During the trickle charge phase, the battery voltage is gradually increased. After the battery voltage is increased to a first voltage V1, the charger is operated in the constant current charge phase to charge the battery at a high constant current I2. During the constant current charge phase, the voltage is also gradually increased. After the battery voltage is increased to a regulation voltage Vr, the charger is operated in the constant voltage charge phase to charge the battery at the regulation voltage Vr. During the constant voltage charge phase, the battery current is gradually decreased as the residual charge capacity of the batter is increased.

FIGS. 2A and 2B are schematic timing diagrams illustrating operations of the conventional charger when the battery is unplugged from electronic device. As shown in FIGS. 2A and 2B, a charging current I3 is provided by the charger to charge the battery, wherein the charging voltage is V3. At the time spot t1, the battery is removed from the electronic device, and the battery is in the unplugged status. Meanwhile, according to the charging status of the battery, the charging voltage is increased or decreased by $\Delta V$, and the charging current is reduced to zero.

FIG. 3 is a schematic circuit diagram illustrating a charging control system for detecting battery removal or absent battery condition in a constant current charger according to the prior art. This charging control system is disclosed in U.S. Pat. No. 6,340,876. As shown in FIG. 3, the charging control system 100 comprises an input power source Vin, a battery 150, a charger 102, a state machine 106, and a detection circuit 10. The detection circuit 10 comprises several logic circuits and two comparators for generating a $\Delta$GONE signal 16 and a $\Delta$VCH signal 14.

After the battery 150 is removed from the charger 102, the charging voltage at output terminal (OUT) of the charger 102 is increased, so that the $\Delta$VCH signal 14 is outputted from the detection circuit 10. In addition, the current through the input terminal (IN) of the charger 102 will be decreased, so that the $\Delta$GONE signal 16 is outputted from the detection circuit 10. According to the $\Delta$GONE signal 16 and the $\Delta$VCH signal 14, the logic circuits of the detection circuit 10 will generate a battery absence signal (NO_BAT). The operating principles of the detection circuit 10 are known in the art, and are not redundantly described herein. According to the battery absence signal (NO_BAT), it is realized that the battery 150 is removed.

From the above discussions, the charging control system uses additional logic circuits to detect whether the battery is removed during the battery 150 is charged by the charger 102. However, the charging control system of this embodiment fails to detect whether the battery is really connected to (or plugged into) the charger 102.

FIG. 4 is a schematic circuit diagram illustrating a battery detector disclosed in U.S. Pat. No. 6,420,854. As shown in FIG. 4, the battery detector 200 comprises a charger 202, an indicator circuit 211, a battery 208, a resistor 210, and an inductor 204. The indicator circuit 211 comprises a capacitor (C) 214, a relay (R) 212, and a transistor 216. A pulse signal is continuously received by a base terminal (VB) of the transistor 216.

In a case that the battery 208 is removed from the battery detector 200, the voltage across the two ends of the capacitor 214 fails to energize the relay 212. On the contrary, after the battery 208 is plugged into the battery detector 200, the voltage across the two ends of the capacitor 214 is sufficient to energize the relay 212. In other words, the energized status and non-energized status of the relay 212 may be employed to judge whether the battery 208 is plugged into or unplugged from the battery detector 200.

However, after the relay 212 is energized, the electric energy is provided by the battery 208. In other words, after the battery 208 is plugged into the battery detector 200, the battery 208 still consumes charge continuously.

Recently, as the battery manufacturing technique is increasingly developed, a lithium battery module is used as the battery of the electronic device to gradually replace the conventional chargeable battery. If the charge capacity of the lithium battery module is very low, it is necessary to force the lithium battery module to stop continuously outputting the charge. Otherwise, the chemical reaction occurring in the lithium battery module may result in a permanent damage of the lithium battery module. FIG. 5 is a schematic circuit diagram illustrating a conventional lithium battery module. As shown in FIG. 5, the lithium battery module 500 comprises a controlling circuit 510, a transistor 520, and a lithium battery set 530. The controlling circuit 510 is connected with the lithium battery set 530 for detecting whether the residual charge quantity of the lithium battery set 530 reaches a threshold charge quantity. If the residual charge quantity of the lithium battery set 530 is not lower than the threshold charge quantity, in response to a control signal from the control terminal C of the controlling circuit 510, the transistor 520 is turned on. Consequently, the lithium battery set 530 of the lithium battery module 500 can output electric energy to the electronic device through the positive terminal (+) and the negative terminal (−). Whereas, if the residual charge quantity of the lithium battery set 530 is continuously consumed to be lower than the threshold charge quantity, in response to a control signal from the control terminal C of the controlling circuit 510, the transistor 520 is turned off. Consequently, the lithium battery set 530 of the lithium battery module 500 fails to output electric energy to the electronic device through the positive terminal (+) and the negative terminal (−).

From the above discussions, if the residual charge quantity of the battery module is lower than the threshold charge quantity, the lithium battery module fails to output charge energy to the electronic device through the positive terminal (+) and the negative terminal (−). Meanwhile, even if the battery module is plugged into the electronic device, there is no detecting mechanism to judge whether the battery module is plugged or unplugged according to the positive terminal (+) and the negative terminal (−). Moreover, the conventional battery detector fails to be applied to such a battery module.

Therefore, there is a need of providing a battery status detection method and a battery status detection apparatus so as to obviate the conventional drawbacks.

SUMMARY OF THE INVENTION

The present invention provides a battery status detection method and a battery status detection apparatus for detecting whether a battery is plugged into or unplugged from an electronic device. According to the plugged or unplugged status, the charger is selectively enabled or disabled. Consequently, the functions of detecting the plugged or unplugged status of the battery module and the power-saving function are both achieved.

An embodiment of the present invention provides a battery status detection method for an electronic device. The battery module is pluggable into the electronic device. When a residual charge quantity of the battery module is lower than a threshold charge quantity, the battery module stops outputting a battery voltage. The battery status detection method includes steps of judging whether the battery module is in a plugged status or an unplugged status according to the battery voltage, periodically charging the battery module in a first time interval of a fixed cycle if the battery module is in the unplugged status, and judging whether the battery module is plugged according to a change of the battery voltage if the battery module is in the unplugged status.

Another embodiment of the present invention provides a battery status detection apparatus for detecting a status of a battery module within an electronic device. When a residual charge quantity of the battery module is lower than a threshold charge quantity, the battery module stops outputting a battery voltage. The battery status detection apparatus includes a charger and a controller. The charger is used for charging the battery module according to an enabling signal. The controller is used for judging whether the battery module is in a plugged status or an unplugged status according to the battery voltage. If the battery module is in the unplugged status, the controller periodically generates the enabling signal in a first time interval of a fixed cycle, and the battery module is charged by the charger in response to the enabling signal when battery is plugged. If the battery module is in the plugged status, the controller judges whether the battery module is switched to the unplugged status according to a change of the battery voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 (prior art) is a schematic timing diagram illustrating a charging current and a terminal voltage of a battery for an electronic device according to the prior art;

FIGS. 2A and 2B (prior art) are schematic timing diagrams illustrating operations of the conventional charger when the battery is unplugged from electronic device;

DETAILED DESCRIPTION OF PREFERRED EMBODIMENTS

The present invention provides a battery status detection method and a battery status detection apparatus for detecting whether a battery is plugged into or unplugged from an electronic device. According to the plugged or unplugged status, the charger is selectively enabled or disabled.

Figure 3:
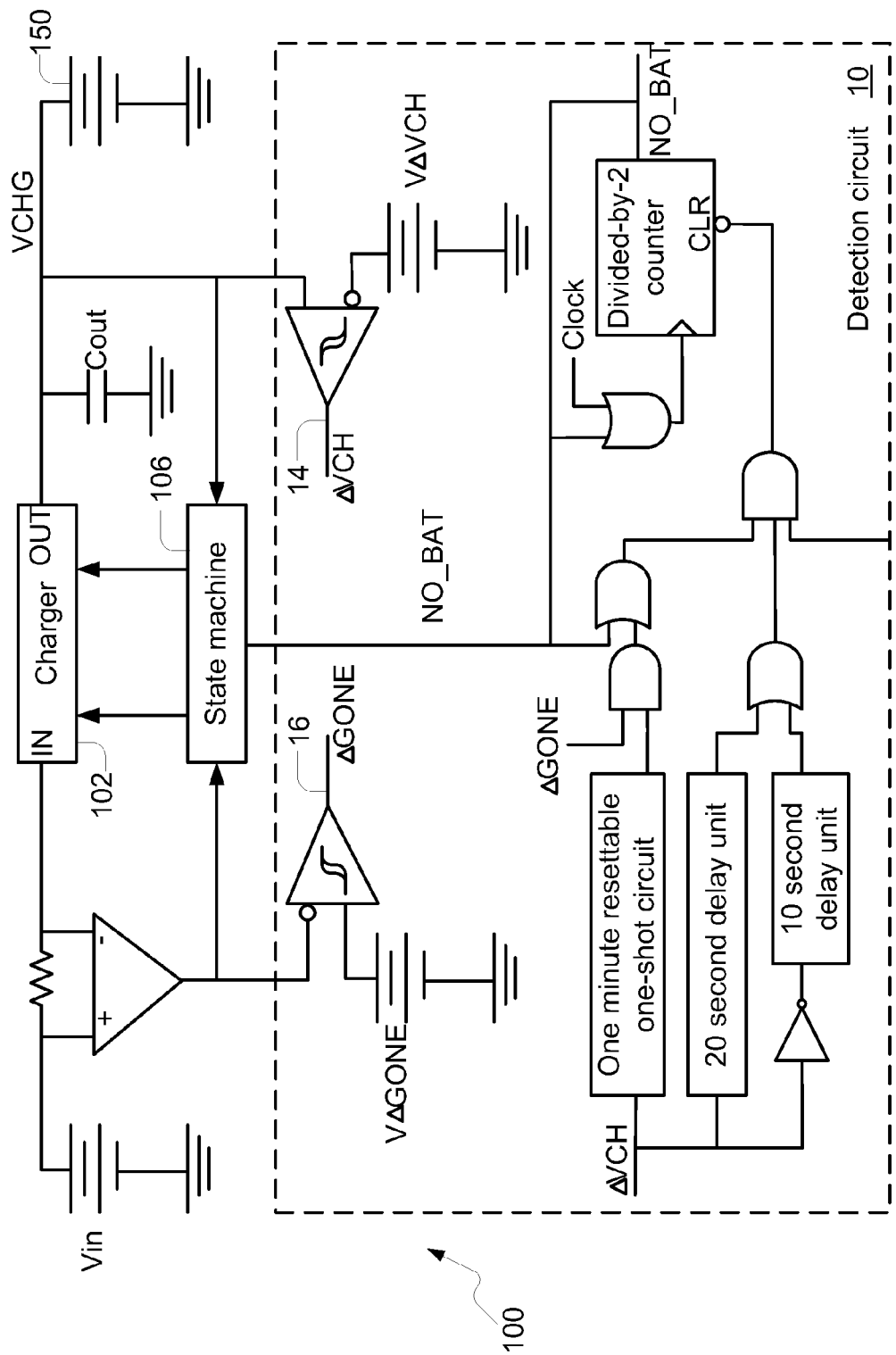
FIG. 3 (prior art) is a schematic circuit diagram illustrating a charging control system for detecting battery removal or absent battery condition in a constant current charger according to the prior art.
Figure 4:
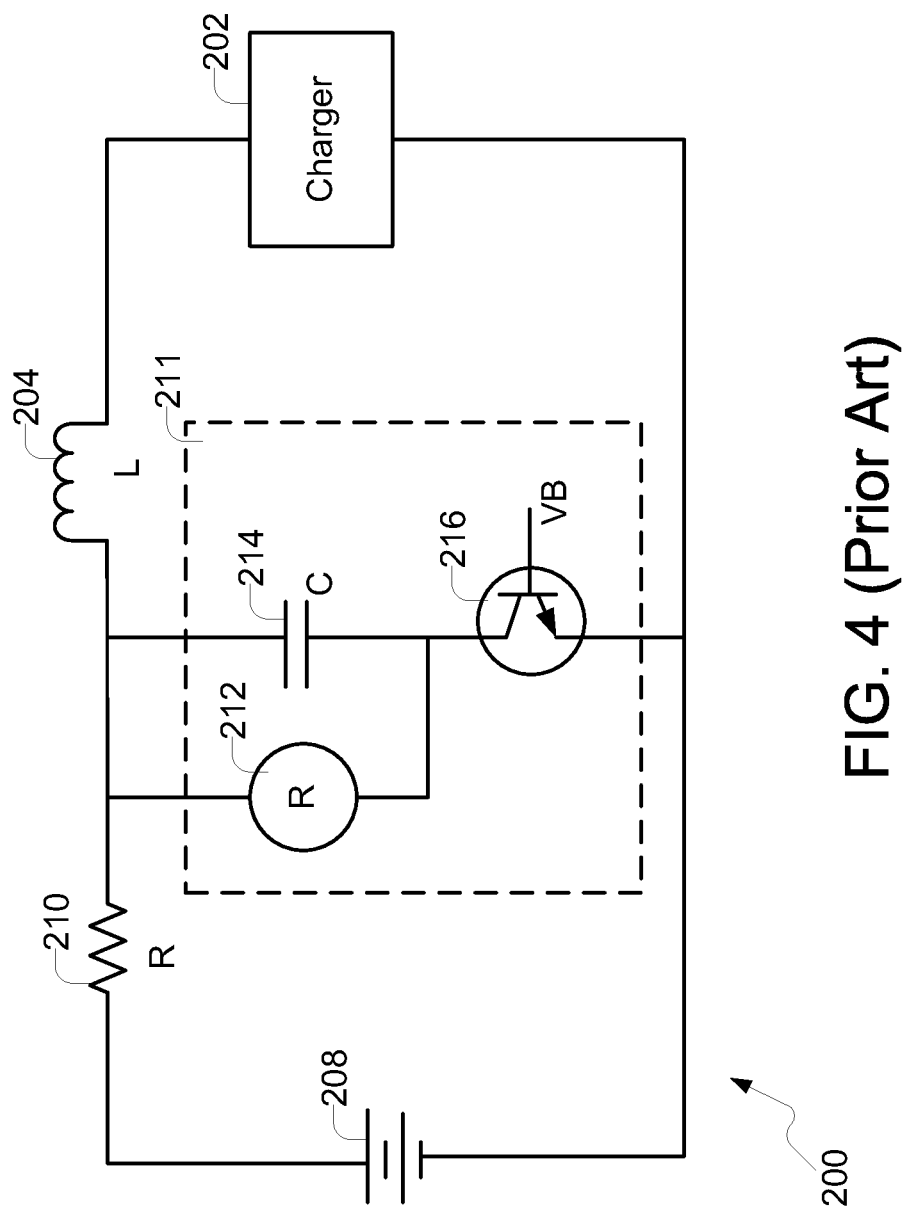
FIG. 4 (prior art) is a schematic circuit diagram illustrating a battery detector disclosed in U.S. Pat. No. 6,420,854.
Figure 5:
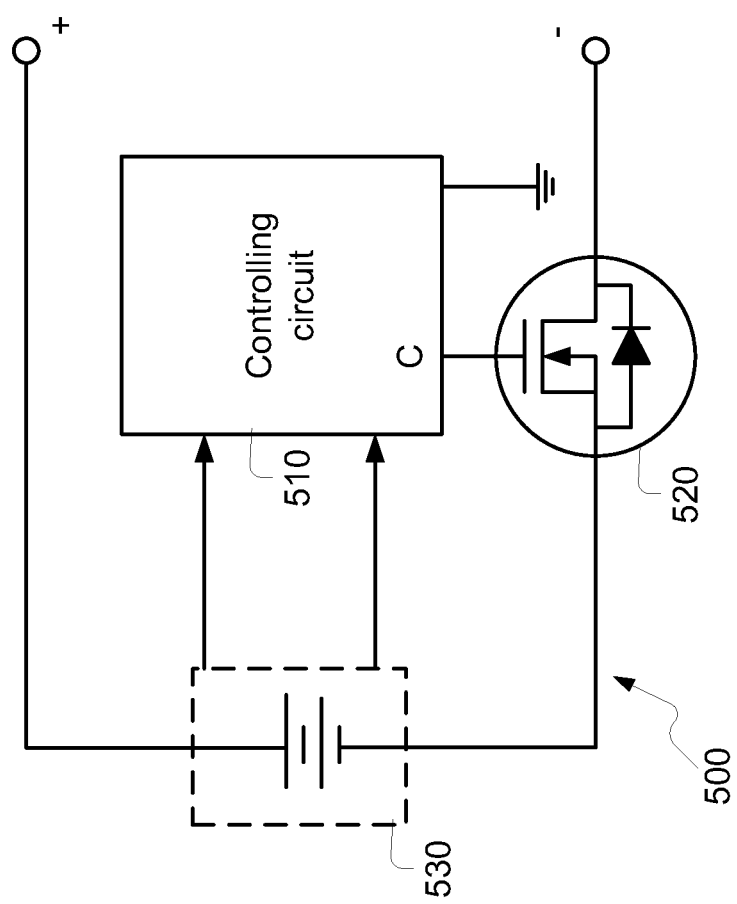
FIG. 5 (prior art) is a schematic circuit diagram illustrating a conventional lithium battery module.
Figure 6A:
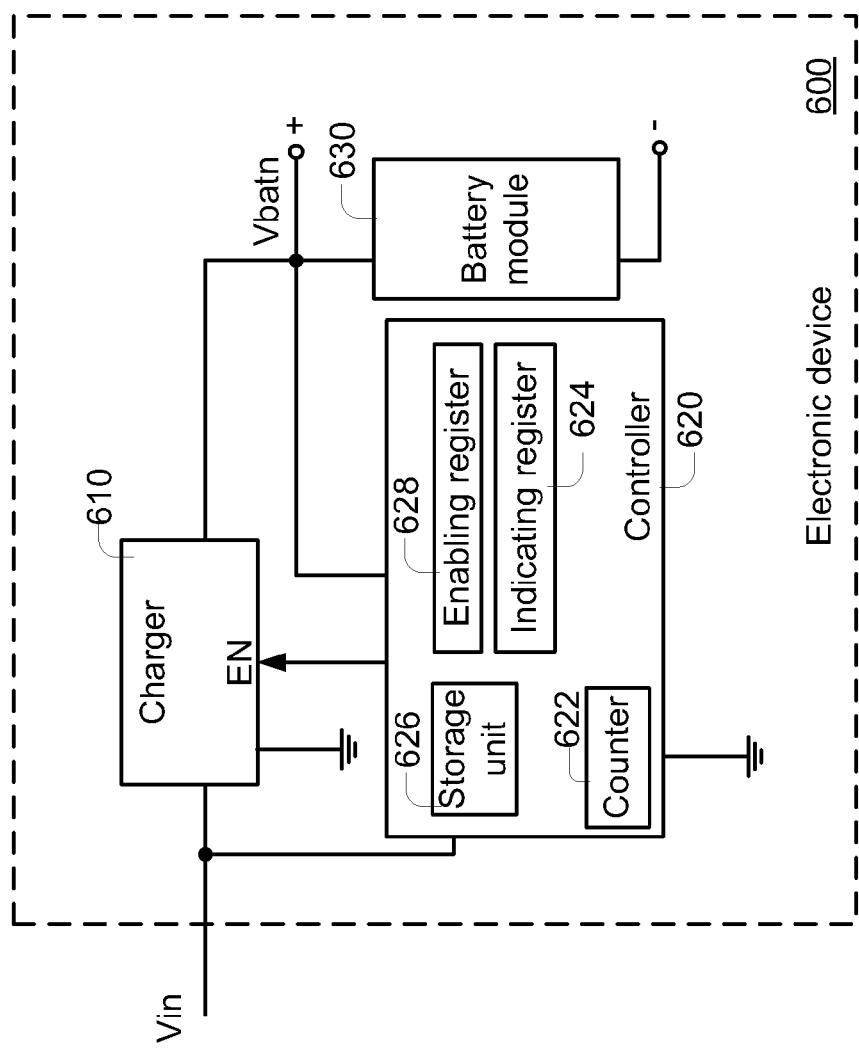
FIG. 6A is a schematic circuit diagram illustrating a battery status detection apparatus for an electronic device according to an embodiment of the present invention.

FIG. 6A is a schematic circuit diagram illustrating a battery status detection apparatus for an electronic device according to an embodiment of the present invention. As shown in FIG. 6A, the battery status detection apparatus is installed within an electronic device 600, and comprises a charger 610, a controller 620, and a battery module 630. An external power Vin is received by the charger 610 and the controller 620. For example, the external power Vin is an output voltage from a power adapter. The charger 610 is connected with the battery module 630. According to an enabling signal EN, a charging operation is performed to charge the battery module 630 by the charger 610. The controller 620 is connected with the battery module 630 for generating the enabling signal EN. Moreover, according to a battery voltage Vbatn, the controller 620 can judge whether the battery module 630 is plugged into the electronic device 600 or not. The operations of the battery module 630 are similar to that of the battery module as shown in FIG. 5. For example, if the residual charge quantity of the battery module 630 is lower than a threshold charge quantity, the battery module 630 fails to output charge energy to other circuits of the electronic device 600 through the positive terminal (+) and the negative terminal (−). Whereas, if the residual charge quantity of the battery module 630 is higher than a threshold charge quantity, the battery module 630 will output charge energy to other circuits of the electronic device 600 through the positive terminal (+) and the negative terminal (−).

In this embodiment, the controller 620 comprises a counter 622, a storage unit 626, an enabling register 628, and an indicating register 624. The counter 622 is a 3-bit counter. Moreover, the counter 622 can continuously and periodically count up from 0 to 7 at a speed of 1 Hz. A value of the battery voltage Vbatn is stored in the storage unit 626. The value of the battery voltage Vbatn may be acquired by an analog-to-digital converter or other means. The value stored in the indicating register 624 indicates a plugged status or an unplugged status of the battery module 630. For example, the logic value "1" indicates the unplugged status, and the logic value "0" indicates the plugged status. The value of the enabling register 628 indicates whether the enabling signal EN is generated or not. For example, the logic value "0" indicates that the enabling signal EN is generated, and the logic value "1" indicates that the enabling signal EN is not generated.

Figure 6B:
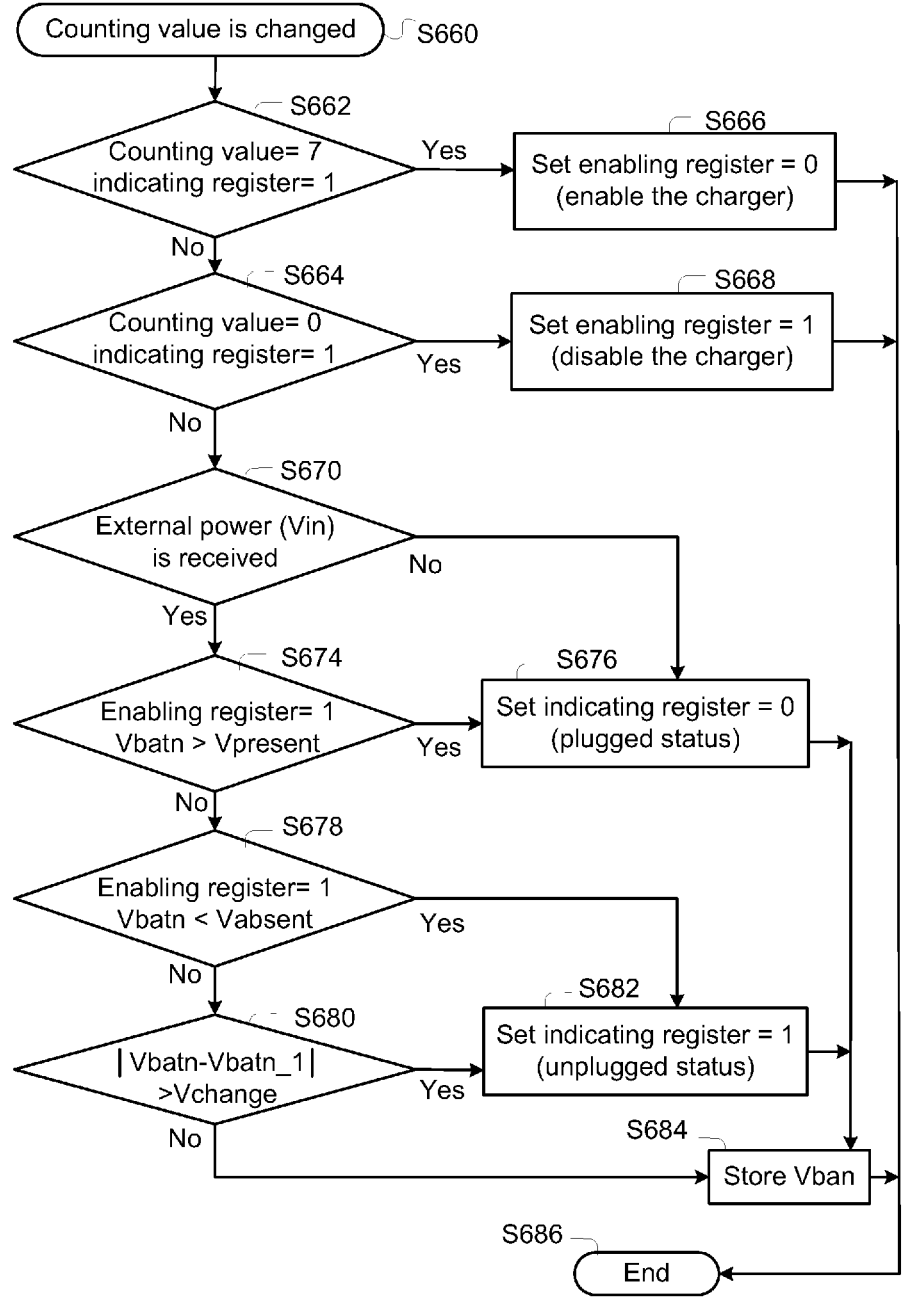
FIG. 6B is a flowchart illustrating an operating process of the controller.

FIG. 6B is a flowchart illustrating an operating process of the controller. The operating process may be executed by a firmware program within the controller 620. Moreover, the operating process is started when the counting value is changed (Step S660).

Then, the step S662 is performed to judge whether the counting value is 7 and the logic value of the indicating register is 1. If the condition of the step S662 is satisfied, it means that the battery module is in the unplugged status. Under this circumstance, the logic value of the enabling register is set to 0. Consequently, the enabling signal EN is generated to enable the charger (Step S666), and then the operating process is ended (Step S686). Whereas, if the condition of the step S662 is not satisfied, the step S664 is done.

The step S664 is performed to judge whether the counting value is 0 and the logic value of the indicating register is 1. If the condition of the step S664 is satisfied, it means that the battery module is in the unplugged status. Under this circumstance, the logic value of the enabling register is set to 1. Consequently, the charger is disabled (Step S668), and then the operating process is ended (Step S686). Whereas, if the condition of the step S664 is not satisfied, the step S670 is done.

The step S670 is performed to judge whether the external power Vin is received. If the condition of the step S670 is not satisfied, the logic value of the indicating register is set to 0. Under this circumstance, the battery is in the plugged status (Step S676). After the battery voltage Vbatn is stored (Step S684), and then the operating process is ended (Step S686).

The, the step S674 is performed to judge whether the logic value of the enabling register is 1 and the battery voltage Vbatn is higher than a first voltage Vpresent. If the condition of the step S674 is satisfied, the logic value of the indicating register is updated as 0 (Step S676) to assure that the battery module is in the plugged status. After the battery voltage Vbatn is stored (Step S684), the operating process is ended (Step S686). Whereas, if the condition of the step S674 is not satisfied, the step S678 is done.

The step S678 is performed to judge whether the logic value of the enabling register is 1 and the battery voltage Vbatn is lower than a second voltage Vabsent. If the condition of the step S678 is satisfied, the logic value of the indicating register is set as 1 to indicate that the battery module is in the unplugged status (Step S682). After the battery voltage Vbatn is stored (Step S684), the operating process is ended (Step S686). Whereas, if the condition of the step S678 is not satisfied, the step S680 is done.

The step S680 is performed to judge whether the absolute value of the difference between the current battery voltage (Vbatn) and the previous battery voltage (Vbatn_1) is higher than a third voltage Vchange. If the condition of the step S680 is satisfied, the logic value of the indicating register is set as 1 to indicate that the battery module is in the unplugged status (Step S682). After the battery voltage Vbatn is stored (Step S684), the operating process is ended (Step S686). Whereas, if the absolute value of the difference between the current battery voltage (Vbatn) and the previous battery voltage (Vbatn_1) is lower than the third voltage Vchange, the battery voltage Vbatn is stored (Step S684), and then the operating process is ended (Step S686). In this embodiment, when the operating process is executed by the firmware program corresponding to the previous counting value, the battery voltage stored in the storage unit before the operating process is ended is the previous battery voltage (Vbatn_1). Moreover, the first voltage Vpresent, the second voltage Vabsent and the third voltage Vchange are preset in the controller 620, wherein the first voltage Vpresent is higher than the second voltage Vabsent.

Generally, there are three mechanisms for powering the electronic device 600. In accordance with the first powering mechanism, only the external power Vin is received, but the battery module 630 is in the unplugged status. In accordance with the second powering mechanism, only the battery module 630 is in the plugged status, but the external power Vin is not received. In accordance with the third powering mechanism, the external power Vin is received, and the battery module 630 is in the plugged status.

After the electronic device 600 is turned on, regardless of the logic value of the indicating register 624 in the controller 620, the battery status detection method of the present invention can quickly realize whether the battery module 630 is in the plugged status or the unplugged status within at most 2 seconds and then update the logic value of the indicating register 624.

In the first powering mechanism, only the external power Vin is received, but the battery module 630 is in the unplugged status. For example, it is assumed that the logic value of the indicating register 624 is 0 (i.e. in the plugged status) after the electronic device 600 is turned on. If the counting value of the counter 622 is 0 (at the first second), since the battery voltage Vbatn is 0 (Vbatn<Vabsent), the implementation of the step S678 can assure that the battery module 630 is in the unplugged status detected, and then the logic value of the indicating register 624 is updated as 1. Alternatively, it is assumed that the logic value of the indicating register 624 is 1 (i.e. in the unplugged status) after the electronic device 600 is turned on. If the counting value of the counter 622 is 1 (at the 2nd second), since the battery voltage Vbatn is 0, the implementation of the step S678 can assure that the battery module 630 is in the unplugged status detected, and then the logic value of the indicating register 624 is updated as 1. Afterwards, once the battery module 630 is plugged into the electronic device 600, the implementation of the step S674 can realize that the battery module 630 is in the plugged status, and then the logic value of the indicating register 624 is updated as 0.

In the second powering mechanism, only the battery module 630 is in the plugged status, but the external power Vin is not received. For example, it is assumed that the logic value of the indicating register 624 is 1 (i.e. in the unplugged status) after the electronic device 600 is turned on. If the counting value of the counter 622 is 1 (at the 2nd second), since the external power Vin is not received, the implementation of the step S670 can assure that the battery module 630 is in the plugged state, and then the logic value of the indicating register 624 is updated as 0. Alternatively, it is assumed that the logic value of the indicating register 624 is 0 (i.e. in the plugged status) after the electronic device 600 is turned on. If the counting value of the counter 622 is 0 (at the first second), since the external power Vin is not received, the implementation of the step S670 can assure that the battery module 630 is in the plugged state, and then the logic value of the indicating register 624 is updated as 0.

In the third powering mechanism, the external power Vin is received, and the battery module 630 is in the plugged status. Depending on the residual charge quantity of the battery module 630, various operating conditions are possible. For example, if the residual charge quantity of the battery module 630 is lower than the threshold charge quantity, since the battery module 630 fails to output the battery voltage Vbatn, the logic value of the indicating register 624 is updated as 1 (i.e. in the unplugged status) within two seconds. Whereas, if the residual charge quantity of the battery module 630 is higher than the threshold charge quantity, the battery voltage Vbatn outputted from the battery module 630 is higher than the first voltage Vpresent. Consequently, the implementation of the step S674 can assure that the battery module 630 is in the plugged status within two seconds and the logic value of the indicating register 624 is updated as 0.

From the above discussions, it is found that if the battery voltage Vbatn is normally outputted from the battery module 630, the battery status indicating method of the present invention is effective to detect the plugged status and the logic value of the indicating register 624 is updated as 0. However, if the residual charge quantity of the battery module 630 is lower than the threshold charge quantity, since the battery module 630 fails to output the battery voltage Vbatn, a misjudgment problem may occur and the logic value of the indicating register is erroneously updated as 1 (i.e. in the unplugged status).

For preventing the misjudgment problem, once the logic value of the indicating register is 1, the battery module 630 is periodically charged for one second in every cycle of eight seconds (see the steps S662 and S664 of FIG. 6B). If the battery module 630 is really plugged into the electronic device 600, the battery module 630 will be periodically charged until the residual charge quantity of the battery module 630 is higher than the threshold charge quantity and the battery voltage Vbatn is outputted from the battery module 630. After the battery voltage Vbatn is outputted from the battery module 630, the logic value of the indicating register 624 is updated as 0 (i.e. in the plugged status).

Figure 7:
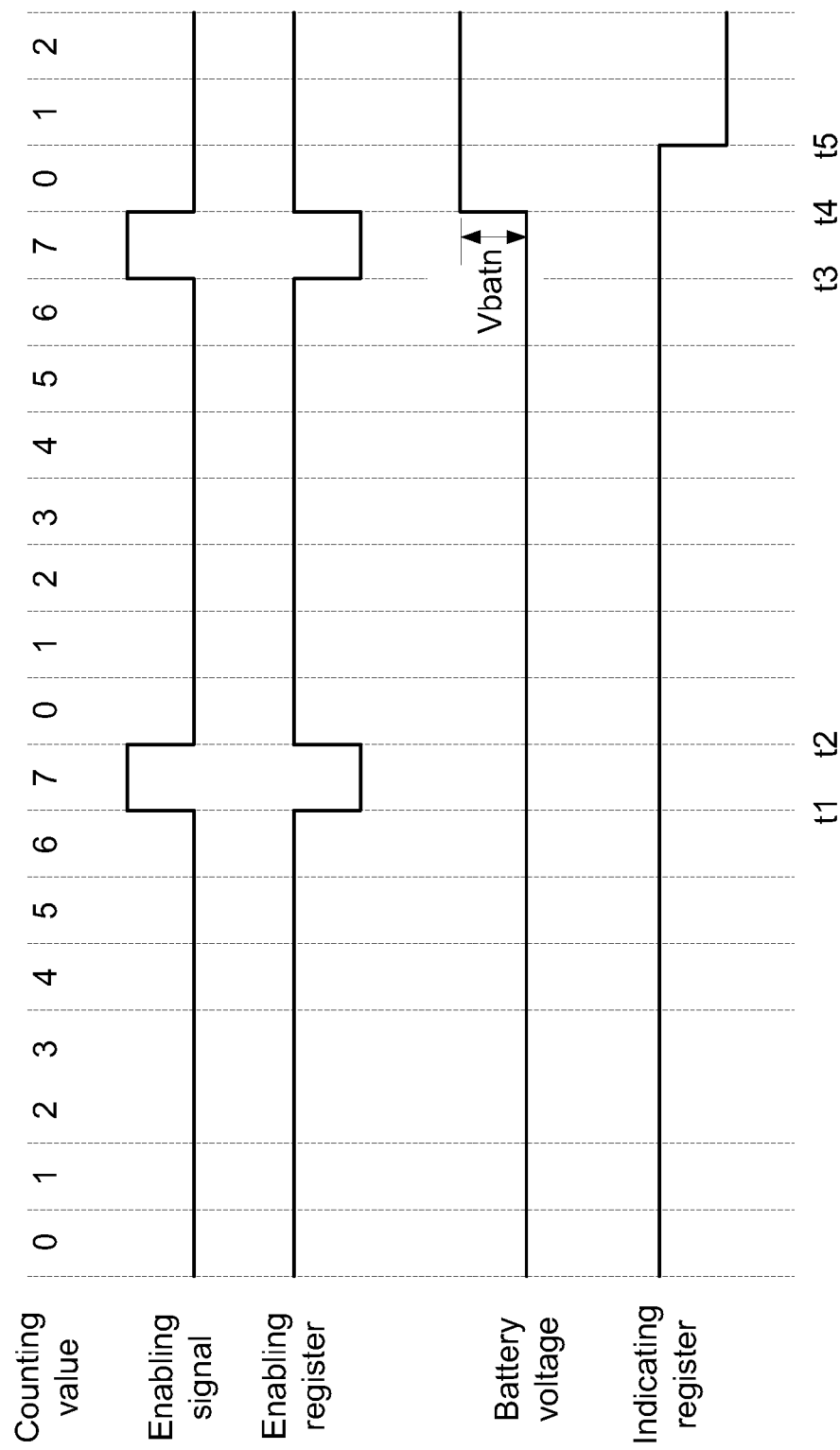
FIG. 7 is a schematic timing diagram illustrating associated signal in a process of charging the battery module whose residual charge quantity is lower than the threshold electric quantity.

Hereinafter, a process of charging the battery module whose residual charge quantity is lower than the threshold charge quantity will be illustrated with reference to FIG. 7. FIG. 7 is a schematic timing diagram illustrating associated signal in a process of charging the battery module whose residual charge quantity is lower than the threshold charge quantity.

The counter 622 of the controller 620 continuously and periodically counts up from 0 to 7 at a speed of 1 Hz. Once the logic value of the indicating register is 1 (unplugged status) and the counting value of the counter 622 is 0, the logic value of the enabling register is set to 1 to disable the charger 610.

Once the logic value of the indicating register is 1 (unplugged status) and the counting value of the counter 622 is 0~6, since the battery voltage Vbatn is zero, the implementation of the step S678 can assure that the logic value of the indicating register 624 is maintained at 1, and the logic value of the enabling register 628 is maintained at 1. Under this circumstance, the battery module 630 is in the unplugged status, and the charger 610 is disabled.

At the time spot t1 when the logic value of the indicating register is 1 (unplugged status) and the counting value of the counter 622 is 7, the enabling register is set to 0 to enable the charger 610.

At the time spot t2 when the logic value of the indicating register is 1 (unplugged status) and the counting value of the counter 622 is 0, the enabling register is set to 1 to disable the charger 610. That is, in the time interval (i.e. one second) between the time spot t1 and the time spot t2 when the counting value of the counter 622 is 7, the charger 610 is enabled in response to the enabling signal so as to charge the battery module 630.

In the time interval between the time spot t2 and the time spot t3 when the counting value of the counter 622 is 0~6, the logic value of the indicating register is maintained at 1 and the logic value of the enabling register is maintained at 1. Under this circumstance, the battery module 630 is in the unplugged status, and the charger 610 is disabled.

At the time spot t3 when the logic value of the indicating register is 1 (unplugged status) and the counting value of the counter 622 is 7, the logic value of the enabling register is set to 0 to enable the charger 610.

At the time spot t4 when the when the logic value of the indicating register is 1 (unplugged status) and the counting value of the counter 622 is 0, the enabling register is set to 1 to disable the charger 610. That is, in the time interval (i.e. one second) between the time spot t3 and the time spot t4 when the counting value of the counter 622 is 7, the charger 610 is enabled in response to the enabling signal so as to charge the battery module 630 again.

After the time spot t4, the enabling register is set to 1 to disable the charger 610. However, since the residual charge quantity of the battery module 630 is higher than the threshold charge quantity at this moment, it is feasible to output the battery voltage Vbatn. Consequently, at the time spot t5 (the counting value is 0), the implementation of the step S674 can assure that the battery voltage Vbatn is higher than the first voltage Vpresent. Meanwhile, the logic value of the indicating register is updated as 0 (i.e. the plugged status).

That is, in a case that the external power Vin is received by the electronic device 600 and the battery module 630 is in the plugged status but fails to output the battery voltage Vbatn, the charger 610 will be periodically enabled for a specified time interval (e.g. one second) to charge the battery module 630. Once the residual charge quantity of the battery module 630 is higher than the threshold charge quantity, the battery module 630 can output the battery voltage Vbatn. At the same time, the logic value of the indicating register 624 is updated as 0 (i.e. the plugged status).

One the other hand, if the external power Vin is received by the electronic device 600 but the battery module 630 is unplugged from the electronic device 600, the charger 610 is still periodically enabled for a specified time interval (e.g. one second). Under this circumstance, the battery module 630 fails to be charged by the charger 610. Since no battery voltage Vbatn is generated, the logic value of the indicating register 624 is maintained at 1 (i.e. the unplugged status).

Moreover, after the controller assures that the battery module 630 is in the plugged status, the charging operation as shown in FIG. 1 is performed by the charger 610 and the controller 620.

Moreover, in a case that the external power Vin is received and the battery module 630 is in the plugged status (i.e. the logic value of the indicating register is 0), the steps S674, S678 and S680 may be performed to judge whether the battery module 630 is unplugged from the electronic device 600. That is, the logic value "0" of the enabling register indicates that the battery module 630 is being charged and the battery module 630 is of course in the plugged status. Alternatively, if the external power Vin is not received by the electronic device 600 and the battery module 630 is unplugged from the electronic device 600, the whole electronic device 600 is instantaneously shut down and the detection is disabled.

During the counting process of the counter 610, if the battery voltage Vbatn is higher than the first voltage Vpresent in the step S674, it is assured that the logical value of the indicating register 624 is 0 and the battery module 630 is in the plugged status. If the battery voltage Vbatn is lower than the second voltage Vabsent in the step S678, the logical value of the indicating register 624 is updated as 1, and thus the battery status is switched to the unplugged status. Alternatively, if the absolute value of the difference between the current battery voltage (Vbatn) and the previous battery voltage (Vbatn_1) is higher than a third voltage Vchange in the step S680, the logical value of the indicating register 624 is updated as 1, and thus the battery status is switched to the unplugged status.

From the above discussions, after the battery module 630 is considered to be in the plugged status, the comparison between the battery voltage Vbatn and the second voltage Vabsent or the comparison between the battery voltage Vbatn and the previous battery voltage (Vbatn_1) may be used to accurately detect whether the battery module 630 is unplugged from the electronic device 600.

Moreover, if the battery module 630 is unplugged from the electronic device 600, the controller 620 will periodically enable the charger 610 to have the charger 610 attempt to charge the battery module 630. Consequently, if a battery module 630 having a residual charge quantity lower than the threshold charge quantity is plugged into the electronic device 600, the residual charge quantity of the battery module 630 will be higher than the threshold charge quantity after several periodical charging operations. Under this circumstance, the controller 620 will switch the status of the battery status to the plugged status according to the battery voltage Vbatn.

From the above discussions, the user may judge whether the battery status is switched to the unplugged status by only performing the step S678 or the step S680. Alternatively, the first voltage Vpresent and the second voltage Vabsent may be collectively replaced by a threshold voltage Vthreshold. That is, if the battery voltage Vbatn is higher than the threshold voltage Vthreshold, the battery module 630 is considered to be in the plugged status. Whereas, if the battery voltage Vbatn is lower than the threshold voltage Vthreshold, the battery module 630 is considered to be in the unplugged status.

In some embodiments, the charger 610 further comprises a low pass filter (not shown) for filtering the AC signal, so that the charging current is more stable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A battery status detection method for an electronic device, a battery module being pluggable into the electronic device, the battery module stopping outputting a battery voltage when a residual charge quantity of the battery module is lower than a threshold charge quantity, the battery status detection method comprising steps of:
   judging whether the battery module is in a plugged status or an unplugged status according to the battery voltage;
   if the battery module is in the unplugged status, periodically charging the battery module in a first time interval of a fixed cycle while said battery module remains connected to said electronic device until the residual charge quantity of the battery module is higher than the threshold charge quantity and the battery voltage is outputted from the battery module; and
   if the battery module is in the plugged status, judging whether the battery module is in the unplugged status according to a change of the battery voltage.

2. The battery status detection method as claimed in claim 1, further comprising steps of:
   if the battery module is in the plugged status and the battery voltage is higher than a first voltage, judging that the battery module is maintained in the plugged status; and
   if the battery module is in the plugged status and the battery voltage is lower than a second voltage, judging that the battery module is in the unplugged status, wherein the first voltage is higher than the second voltage.

3. The battery status detection method as claimed in claim 1, further comprising steps of:
   if the battery module is in the plugged status and the battery voltage is higher than a first voltage, judging that the battery module is maintained in the plugged status; and
   if the battery module is in the plugged status and an absolute value of a difference between the battery voltage and a previous battery voltage is higher than a third voltage, judging that the battery module is in the unplugged status.

4. The battery status detection method as claimed in claim 1, wherein a counter periodically generates a plurality of counting values during the fixed cycle, and one of the counting values is generated in the first time interval.

5. The battery status detection method as claimed in claim 1, wherein the electronic device is a notebook computer, a personal digital assistant or a mobile phone.

6. A battery status detection apparatus for detecting a status of a battery module within an electronic device, the battery module stopping outputting a battery voltage when a residual charge quantity of the battery module is lower than a threshold charge quantity, the battery status detection apparatus comprising:
   a charger for charging the battery module according to an enabling signal;
   a controller for judging whether the battery module is in a plugged status or an unplugged status according to the battery voltage,
   wherein if the battery module is in the unplugged status, the controller periodically generates the enabling signal in a first time interval of a fixed cycle while said battery module remains connected to said electronic device until the residual charge quantity of the battery module is higher than the threshold charge quantity and the battery voltage is outputted from the battery module, and the battery module is charged by the charger in response to the enabling signal, and
   wherein if the battery module is in the plugged status, the controller judges whether the battery module is in the unplugged status according to a change of the battery voltage.

7. The battery status detection apparatus as claimed in claim 6, wherein the controller further comprises:

a counter for periodically generating a plurality of counting values during the fixed cycle, wherein one of the counting values is generated in the first time interval;

an indicating register, wherein if the battery module is in the plugged status, the indicating register is set to have a first value, wherein if the battery module is in the unplugged status, the indicating register is set to have a second value;

an enabling register, wherein if the enabling register has a third value, the enabling signal is generated, wherein if the enabling register has a fourth value, the enabling signal is not generated; and a storage unit for temporarily storing the battery voltage.

8. The battery status detection apparatus as claimed in claim 7, wherein if an external power is received by the electronic device and the battery voltage is higher than a first voltage, the indicating register is set to have the first value, wherein if the external power is received by the electronic device and the battery voltage is lower than a second voltage, the indicating register is set to have the second value, wherein the first voltage is higher than the second voltage.

9. The battery status detection apparatus as claimed in claim 7, wherein if an external power is received by the electronic device and the battery voltage is higher than a first voltage, the indicating register is set to have the first value, wherein if the external power is received by the electronic device and an absolute value of a difference between the battery voltage and a previous battery voltage stored in the storage unit is higher than a third voltage, the indicating register is set to have the second value.

10. The battery status detection apparatus as claimed in claim 6, wherein the electronic device is a notebook computer, a personal digital assistant or a mobile phone.

* * * * *